(12) United States Patent
Krüger et al.

(10) Patent No.: US 7,028,243 B2
(45) Date of Patent: Apr. 11, 2006

(54) METHOD AND DEVICE FOR ERROR CORRECTION OF DATA BLOCKS

(75) Inventors: Martin Krüger, München (DE); Michael Weber, Freising (DE); Xiaofeng Wu, Neubiberg (DE); Bin Yang, Herrenberg (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/650,816

(22) Filed: Aug. 28, 2003

(65) Prior Publication Data

US 2004/0078745 A1    Apr. 22, 2004

Related U.S. Application Data

(63) Continuation of application No. PCT/DE02/00405, filed on Feb. 4, 2002.

(30) Foreign Application Priority Data

Feb. 28, 2001  (DE) .................. 101 09 536
May 17, 2001  (DE) .................. 101 24 180

(51) Int. Cl.
    *H03M 13/00*   (2006.01)

(52) U.S. Cl. ................ 714/780; 714/758; 375/234
(58) Field of Classification Search ........ 714/752–758; 375/229, 234

See application file for complete search history.

(56) References Cited

U.S. PATENT DOCUMENTS

| 4,495,623 A | * | 1/1985 | George et al. .............. 714/755 |
| 4,521,886 A | | 6/1985 | Dollard et al. |
| 5,712,861 A | * | 1/1998 | Inoue et al. ................ 714/752 |
| 6,021,518 A | | 2/2000 | Pelz |
| 6,381,726 B1 | | 4/2002 | Weng |

FOREIGN PATENT DOCUMENTS

| DE | 42 19 400 A1 | 12/1993 |
| DE | 196 03 724 A1 | 4/1997 |
| DE | 199 63 683 A1 | 10/2000 |
| EP | 0 492 812 A2 | 7/1992 |
| EP | 0 567 799 A1 | 11/1993 |
| JP | 62188075 | 8/1987 |

OTHER PUBLICATIONS

Bhattacharyya, D. K. et al.: "Theory and Design of SEC-DED-AUED Codes", IEE Proc.-Comput. Digit. Tech., vol. 145, No. 2, Mar. 1998, pp. 121-126.

(Continued)

*Primary Examiner*—Guy J. Lamarre
(74) *Attorney, Agent, or Firm*—Laurence A. Greenberg; Werner H. Stemer; Ralph E. Locher

(57) ABSTRACT

In a method for error correcting a data signal that is transmitted via a channel and contains data blocks with associated error checking information, the data signal is first equalized, with calculated soft-bit information. In a subsequent step, the error checking information is evaluated with respect to the data block. If the evaluation of the error checking information shows that a single bit error is present in one message bit, the single bit error is corrected only when a condition that is dependent on the soft-bit information is satisfied.

9 Claims, 2 Drawing Sheets

OTHER PUBLICATIONS

Cheng-Chi, C. et al.: "Effect of Coder/Decoder Reliability on Bit Error Rate Performance of Wireless Communication Systems", IEEE, 1997, pp. 117-124.

Tervo, R.: "Soft Decision Algorithm and Readable Erasure Correction for a BFSK Demodulator", IEEE, 1993, pp. 419-422.

* cited by examiner

| Classes | Class reference pattern | | | |
|---|---|---|---|---|
| 0 | 0 ... 00 | | ...... | |
| 1 | 0 ... 01 | | ...... | |
| 2 | 0 ... 10 | | ...... | |
| ⋮ | ⋮ | | ...... | |
| n | 1 ... 00 | | ...... | |
| n+1 | 0 ... 11 | | ...... | |
| ⋮ | ⋮ | | ...... | |
| $2^{n-k}-1$ | | | ...... | |

↕ $2^{n-k}$

↔ $2^k$ Error pattern

FIG. 3

METHOD AND DEVICE FOR ERROR CORRECTION OF DATA BLOCKS

CROSS-REFERENCE TO RELATED APPLICATION

This application is a continuation of copending International Application No. PCT/DE02/00405, filed Feb. 4, 2002, which designated the United States and was not published in English.

BACKGROUND OF THE INVENTION

Field of the Invention

The invention relates to a method and a device for error correction of a data signal that is transmitted via a channel, and contains data blocks with associated error checking information.

One general objective for the transmission of data via a channel, in particular a mobile radio channel, is to provide as high a data rate as possible with as few transmission errors as possible. Transmission errors may be caused not only by the electronics that are used in the transmitter and in the receiver, but also by distortion during the transmission of the signal via the radio channel.

In the transmitter, the data bits pass through what is referred to as a logical channel, which is matched to the type of data and is normally defined by channel coding (which is frequently also referred to as error protection coding), interleaving, structuring of the coded and interleaved data into frames, and by the modulation method that is used. On the other hand, the transmission of the data via the radio path is described by what is referred to as the physical channel that, in the case of a mobile radio channel, does not vary with time and is subject to multipath propagation.

Various measures are known for configuring a logical channel for transmission with as few errors as possible. One particularly effective measure for error reduction is to subject the signal to be transmitted to convolutional coding. The receiver-end decoding of convolutional-coded data signals is carried out by a Viterbi decoder, which decodes the coded bits provided by the equalizer. Convolutional coding has the disadvantage that a relatively large amount of redundancy is inserted into the transmitted data stream. A further measure for error protection, which is used when data is transmitted in blocks, is to attach error checking information to the message bits, which the receiver can use to check the correctness of the detected data. This measure is generally less effective than convolutional coding, but has the advantage over it that less redundancy is generally required than for the convolutional coding.

It is also already known for these two measures to be combined (convolutional coding and the addition of error checking information).

Furthermore, it is already known for the error checking information to be configured such that it can be used not only to check the correctness of the received data bits, but can also be used to correct bit errors. In this case, a suitable receiver-end calculation on the basis of the error checking information clearly indicates which of the transmitted data bits is incorrect. The bit error is then corrected by inversion of the bit that has been identified as being incorrect. In many cases, correction of all the single bit errors results in a noticeable improvement in the sensitivity. Furthermore, this allows a high data rate since incorrectly transmitted data blocks can be identified and "repaired", thus making it possible to avoid the necessity to retransmit these data blocks.

As has been identified in the course of the present invention, there may, however, be a problem with single bit error correction in that it significantly increases the probability of occurrence of unidentified errors (that is to say data blocks which pass the error check even though they have bit errors in the message bits).

SUMMARY OF THE INVENTION

It is accordingly an object of the invention to provide a method and a device for error correction of data blocks that overcome the above-mentioned disadvantages of the prior art devices and methods of this general type. The invention is based on the object of specifying a method for single bit error correction for a signal that is transmitted via a channel, using error checking information which keeps the probability of the occurrence of unidentified errors low. A further aim of the invention is to provide a device for single bit error correction having this characteristic.

With the foregoing and other objects in view there is provided, in accordance with the invention, a method for error correcting a data signal transmitted via a channel and containing data blocks with associated error checking information. The method includes calculating soft-bit information relating to message bits in a data block, and evaluating the associated error checking information with respect to the data block to determine if a single bit error exists and, if the single bit error exists, determining a location of the single bit error resulting in a located single error bit. The located single bit error is corrected if: a first variable, determined on a basis of the soft-bit information and allows an assessment as to whether more than one message bit in the data block is incorrect, satisfies a first threshold value condition, and a second variable, determined on a basis of the soft-bit information and allows an assessment as to whether the message bit to be corrected is incorrect, satisfies a second threshold value condition.

First, a qualitative explanation will be given as to why the probability of the occurrence of unidentified errors in a message bit increases when single bit error correction is carried out. A quantitative estimate for one specific coding method (CS-4) will be given later.

Unidentified bit errors in the message part of a data block may occur for two reasons. It is possible with a very low probability $P_u$ for a transmitted data block to have one or more bit errors in the message bits, but nevertheless to be identified as being free of errors in the receiver-end error check, on the basis of the error checking information which is associated with the data block. A further contribution to the probability of unidentified errors occurring in the message bits is caused by single bit error correction itself. This is because the algorithm which is used for detection of a single bit error is never ideally perfect, that is to say there is a certain probability of incorrect single bit error correction. Since the block with the incorrectly corrected single bit error is regarded as having been "repaired", and thus has an error-free block, incorrect single bit error correction causes unidentified errors.

If $P_{wc}$ (wc=wrong correction) is used to denote the probability of incorrect single bit error correction being carried out on a message bit, if a single bit error is always corrected whenever it is identified, the overall probability $P'_u$ of occurrence of an unidentified error has the value:

$$P'_u = P_u + P_{wc}.$$

In the context of the invention, it has now been identified that the contribution $P_{wc}$ that results from carrying out incorrect single bit error correction may be considerably greater than the contribution $P_u$ caused by "overlooking" a single bit error at the receiving end. In other words, carrying out the single bit error correction process as is known in the prior art can drastically increase the probability of the occurrence of unidentified errors in the message part of the data block.

On the basis of the method according to the invention, soft-bit information is calculated for the bits in a data block. This is normally done in the course of equalization of the data signal, but may also be done during channel decoding. In a next step, the error checking information relating to the data block is evaluated. If it is found from the evaluation of the error checking information that there is a single bit error in a message bit, the single bit error is corrected only if a condition is satisfied which is dependent on the soft-bit information associated with the data block under consideration.

In other words, when a single bit error is found in a message bit, the soft-bit information relating to the bits in the data block is used to decide whether single bit error correction should or should not be carried out. Therefore, in contrast to conventional methods, in which bit error correction is always carried out whenever a single bit error is found, that, according to the invention, the single bit error correction is made dependent on whether a specific condition is or is not satisfied (with this condition being dependent on the soft-bit information associated with the data block under consideration).

On the one hand, according to the invention, the single bit error is corrected only when a first variable, which is determined on the basis of the soft-bit information and allows assessment as to whether more than one message bit in the data block is incorrect, satisfies a first threshold value condition. The condition to be investigated is thus that the quality of the received data block is checked to determine how many message bits have a high error probability. This takes account of the fact that single bit error correction in a data block has a comparatively high probability of not being worthwhile for the occurrence of two or more bit errors, since there is a comparatively high risk with this procedure of producing a data block with an unidentified error.

Furthermore, the method according to the invention is distinguished in that a single bit error is corrected only if a second variable, which allows assessment as to whether the message bit to be corrected is incorrect, satisfies a second threshold value condition. This measure thus checks the quality of the message bit that is intended to be inverted for the single bit error correction. The single bit error correction is also actually carried out only if its error probability is sufficiently high. This likewise reduces the probability of producing an unidentified error in the course of the single bit error correction process.

In one particularly preferred embodiment variant, the combination of the two measures explained above allows the probability of occurrence of unidentified errors to be reduced by several orders of magnitude.

The method according to the invention is used particularly advantageously for error correction of data blocks in general packet radio service (GPRS) mobile radio systems. In GPRS mobile radio systems, data packets are transmitted using common packet channels, with this resulting, inter alia, in a particular advantage in that permanent links can be maintained, in contrast to the global system for mobile telecommunications (GSM) system.

In the case of GPRS, the maximum data rate is achieved using the coding scheme CS-4. Since, in the case of CS-4, the use of convolutional coding is dispensed with for 428 of the total of 431 message bits in a data block, high bit error rates occur with CS-4. In the case of CS-4, the method according to the invention allows single bit error correction to be carried out, while conventional single bit error correction methods for CS-4 cannot be used, since they cause unacceptably high probabilities of the occurrence of unidentified bit errors, owing to their high contribution $P_{wc}$.

Other features which are considered as characteristic for the invention are set forth in the appended claims.

Although the invention is illustrated and described herein as embodied in a method and a device for error correction of data blocks, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is an illustration of possible error patterns of data blocks, grouped on the basis of error forms calculated at a receiver end using error information.

DESCRIPTION OF THE PREFERRED EMBODIMENTS

Figure 1:
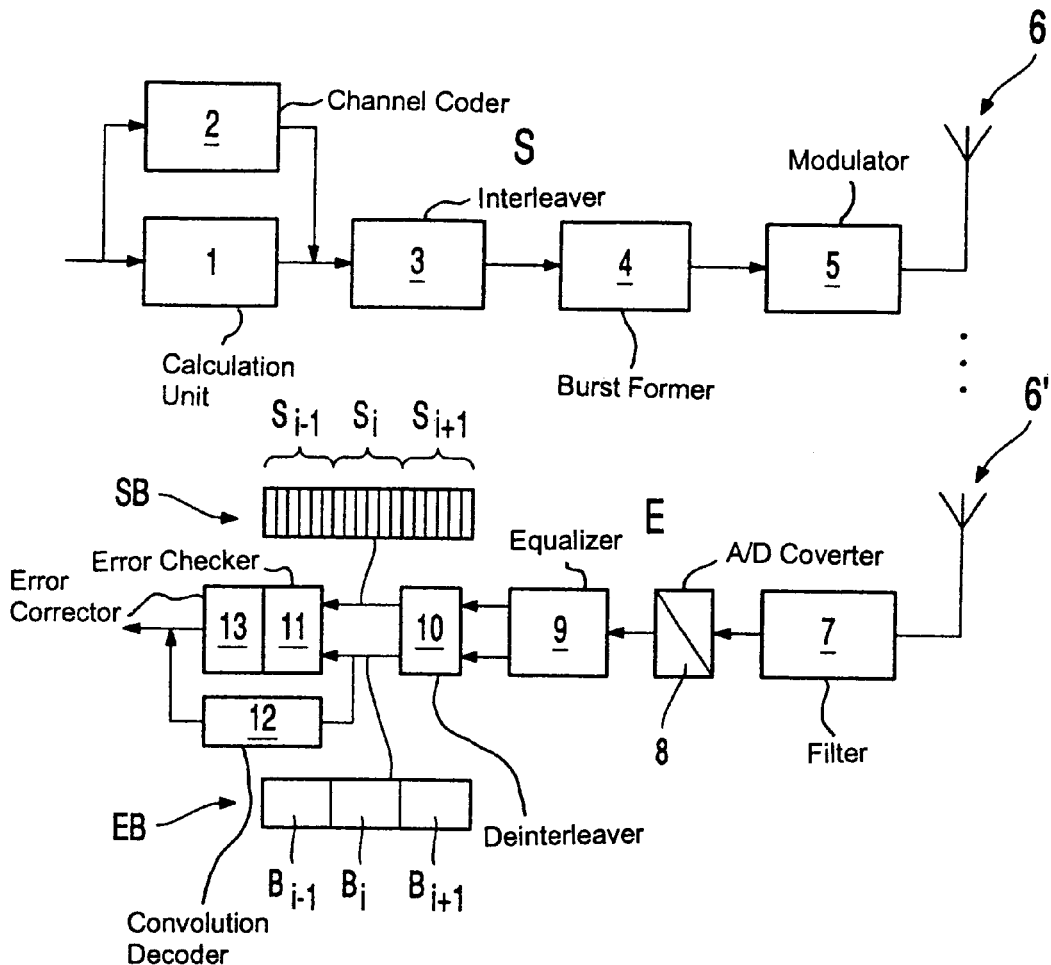
FIG. 1 is a block diagram illustrating signal processing in a mobile radio transmitter and in a mobile radio receiver according to the invention.

Referring now to the figures of the drawing in detail and first, particularly, to FIG. 1 thereof, there is shown the structure of a mobile radio system containing a mobile radio transmitter S and a mobile radio receiver E.

The mobile radio transmitter S has a calculation unit 1 for error checking information, an optional channel coder 2, an interleaver 3, a burst former 4, a modulator 5 and a transmitting antenna 6.

The calculation unit 1 for error checking information is supplied with a digital, generally source-coded, input signal. The bits of the input signal are referred to as message bits. The calculation unit 1 for error checking information calculates error checking information from the sequence of message bits. To be more precise, error checking information is in each case calculated for a sequence of message bits containing a predetermined number of bits, with the error checking information likewise representing a predetermined sequence of bits, referred to in the following text as error checking bits or parity bits. The calculated sequence of error checking bits is attached to the sequence of message bits. The data structure constructed from the two sequences forms a data block.

In the illustrated example, the calculation unit 1 for error checking information is connected in parallel with the channel coder 2. The channel coder 2 carries out convolutional coding either with respect to all the message bits or only with respect to specific message bits that are worthy of particular protection. For example, in the case of the CS-4 coding method, only three of the 431 message bits in a message bit sequence are convolutionally coded, while the remaining 428 message bits are not subjected to convolutional coding.

The data blocks that are formed in this way are supplied to the interleaver 3. The interleaver 3 carries out an interleaving process. The purpose of the interleaving process is to reduce the influence of errors that occur in groups (so-called group errors), which are typical in mobile radio transmission.

The data stream that has been pretreated in this way is supplied to the burst former 4. This embeds the data blocks, which are provided with error checking information, in a frame structure, which is characteristic of the respective mobile radio system. If, for example, a time division multiple access (TDMA) component is used, then the bursts, which have a predetermined duration, are passed on to the modulator 5, and are transmitted via the transmitting antenna 6 only, for example, once in each frame period.

Higher-order modulation methods (for example 8PSK (PSK: Phase Shift Keying) instead of Gaussian minimum shift keying (GMSK) for EDGE)) are preferably used for modulation.

The mobile radio receiver E has a receiving antenna 6', a receiving amplifier and receiving filter 7, an analog/digital converter 8, an equalizer 9, a deinterleaver 10, a unit for evaluation of error checking information 11 and a unit for error correction 13. The units 11, 13 for evaluation of error checking information and for error correction may optionally be connected in parallel with a convolutional decoder 12.

The signal which is emitted by the transmitting antenna 6 is received by the receiving antenna 6' and is supplied to the receiving amplifier and receiving filter 7. In the signal path downstream from this, the received signal is digitized by the analog/digital converter 8.

The digitized signal is supplied to the equalizer 9 which may, in a known manner, be in the form of an adaptive coherent equalizer and for this purpose may have a non-illustrated channel estimator.

For each detected data symbol, the equalizer 9 emits reliability information in the form of so-called soft-bits. The reliability information, which is also referred to as soft-bit information, indicates for each emitted ("decided") bit a value that is representative of the probability of a bit error. An integer value is normally represented by the soft-bits, which is high when the probability of the corresponding bit being incorrect is low.

The deinterleaver 10 returns the two bit streams (decided bits and associated soft-bit information) to the correct sequence, that is to say it reverses the permutation of the bits carried out during the interleaving process in the interleaver 3. A stream EB of decided bits $B_{i-1}$, $B_i$, $B_{i+1}$ is thus produced downstream from the deinterleaver 10, and this is a reconstruction of the bit stream, provided with the error checking information, upstream of the interleaver 3, resulting in a bit stream SB, formed from soft-bit words $S_{i-1}$, $S_i$, $S_{i+1}$ with the bits $B_{i-1}$, $B_i$, $B_{i+1}$ of associated reliability information.

The stream of decided bits EB and the soft-bit stream SB are supplied to the unit 11 for evaluation of error checking information. The unit 11 for evaluation of error checking information uses the error checking information received for a block to determine whether a block has been transmitted without errors. If it is found that the block has been transmitted without errors, no further measures are necessary. If it is found that the block has been transmitted with two or more errors, error correction is impossible, since the error checking information does not allow the identification of the incorrectly transmitted bits when there are two or more errors. However, if it is found from the evaluation of the error checking information that the received data block contains one, and only one, bit error, the error checking information allows the supposedly incorrect bit to be identified.

Figure 2:
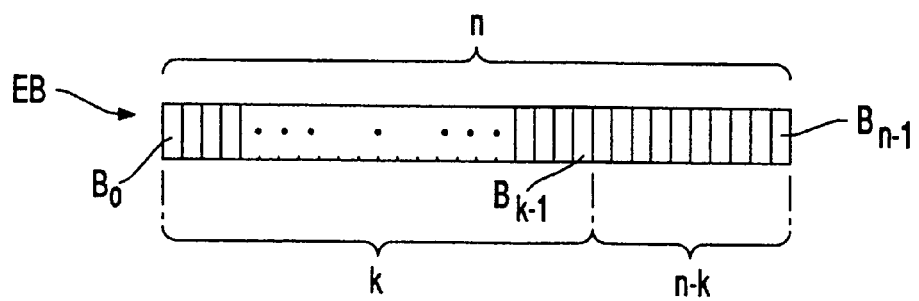
FIG. 2 is an illustration of a structure of a transmitted data block with error checking information.

The evaluation of the error checking information when using a cyclic code (n, k) will be explained in the following text. FIG. 2 shows the configuration of a data block. The total number of bits in the data block is n, while k indicates the number of message bits. The data block contains n–k error information bits (parity bits). Since, as already mentioned, these are calculated at the transmitter end from the k message bits, this results in that there are $2^k$ permissible data blocks and $2^n$ possible data blocks, including all conceivable bit errors.

The evaluation of the error information (parity bits) in the unit 11 is known from the prior art and may, for example, be carried out as now described.

The n bits that are attached to one another are interpreted as coefficients of a polynomial that is divided by a different polynomial that is stored in the receiver E. The remainder polynomial that results from the polynomial division process provides information as to whether the received bits are correct. If one, and only one, bit in the transmitted block is incorrect, it is clearly evident from the remainder polynomial which bit is incorrect. The supposedly incorrect bit is thus identified.

Let us assume that the supposedly incorrect bit is a message bit. In this case, it can be assumed that the received message is incorrect. The supposedly incorrect message bit is now, according to the invention, either inverted or not inverted in the unit 13. The decision as to whether inversion is or is not carried out is made, according to the invention, on the basis of a check of the soft-bit information. The check may be based on various conditions.

A first option is to carry out the inversion of the supposedly incorrect message bit only when a variable that is representative of the probability of more than one message bit in the data block being incorrect is not excessively high. This can be done by counting the number of message bits $B_0, \ldots, B_{k-1}$, whose associated soft-bits $S_0, \ldots, S_{k-1}$ indicate a particularly high error probability. The criterion for a particularly high error probability is in this case a threshold $S_{HFW1}$. The number of message bits with a soft-bit value of less than the threshold $S_{HFW1}$ is annotated $K_{HFW}$.

Furthermore, a threshold $K_{SB}$ is defined, which is an integer. A block is regarded as a "good block" if $K_{HFW} < K_{SB}$, that is to say if the number of error-critical message bits is less than the predefined threshold $K_{SB}$. This condition is referred to in the following text as condition 1.

Another option is to assess the error probability of that message bit which was identified as being supposedly incorrect in the error information check. A second threshold $S_{HFW2}$ is defined for this purpose, which need not be identical to $S_{HFW1}$. A check is then carried out to determine whether the soft-bit value $S_i < S_{HFW2}$ which is associated with the supposedly incorrect message bit is indicative, that is to say whether the bit which has been identified as being supposedly incorrect actually has a high error probability on the basis of the soft-bit information. This condition is referred to in the following text as condition 2.

Further or else other conditions based on the soft-bit information that is supplied can be defined and checked in a similar manner. For example, the variable that is calculated for the first condition may also be the probability that is calculated directly from the soft-bit information of the presence of two or more bit errors in the message part of the data block.

In a first exemplary embodiment of the invention, the message bit that has been identified as supposedly incorrect is corrected when, and only when, condition 1 is satisfied. According to a second exemplary embodiment of the invention, the message bit that has been identified as supposedly incorrect is inverted when, and only when, condition 2 is satisfied. A particularly preferred third exemplary embodiment is characterized in that the supposedly incorrect message bit is inverted when, and only when, both condition 1 and condition 2 are satisfied.

It should be noted that the transmitter/receiver configuration illustrated in FIG. 1 represents a specific example, which is used to explain the invention but which can be modified in a wide range of ways. For example, the channel coder 2 in the transmission signal path may also be disposed downstream from the calculation unit 1 for the error checking information and, in consequence, the channel decoder 12 may be located upstream of the units 11, 13 in the reception signal path. In this case, the soft-bit information may also be emitted from the channel decoder 12.

An estimate for the CS-4 coding method will now be used to explain why single bit error correction, which must be carried out in the conventional manner, is impossible with this coding method, and the extent to which a reduction in unidentified errors in data blocks can be achieved by the method according to the invention. For the CS-4 coding method, n=447 and k=431. In consequence, one data block contains n−k=16 parity bits.

FIG. 3 shows a schematic illustration of all possible $2^n$ data blocks grouped on the basis of different error bit information calculated at the receiver end. Each calculated error bit information item is associated with $2^k$ data blocks, which are also referred to in the following text as error patterns. One class is formed by those $2^k$ error patterns that give the same error bit information. In the table shown in FIG. 3, the classes are shown in the table rows, and the error patterns in the table columns. In this case, the first column in each case shows the error pattern (data block) with the lowest weighting (that is to say the number of bits with the value 1). This is referred to as the class reference pattern in each class. A cyclic code is normally formed such that the class reference patterns always have the lowest possible weighting.

According to FIG. 3, the $2^n$ error patterns may be classified as follows:
a). The class 0 with the class reference pattern, which contains only zeroes, contains the $2^k$ permissible error patterns, that is to say those data blocks which have been found to be correct on the basis of the error checking information.
b). The n subclasses 1 to n contain those error patterns which contain one, and only one, incorrect bit. In this case, a distinction is drawn between:
  b.1: The subclasses 1 to k contain those error patterns in which the single bit error is a message bit.
  b.2: The subclasses k+1 to n contain those error patterns in which the single bit error is a parity bit.
c). The remaining $2^{n-k}-(n+1)$ subclasses contain those error patterns with more than two bit errors. Their class reference pattern has a weighting of >2.

As already explained, the present invention considers the correction of single bit errors in case b.1.

A binary symmetrical channel (BSC) is considered with a bit inversion error probability p. The probability $P_w$ of a specific error pattern with the weighting w is then:

$$P_w = p^w(1-p)^{n-w} \quad (w=0,1,2,\ldots) \qquad (1)$$

The number of error patterns with the weighting w which relate to the k message bits is:

$$N_w = \binom{k}{w} = \frac{k(k-1)\ldots(k-w+1)}{w!} \qquad (2)$$

On the assumption that all these error patterns are distributed with equal probability over the $2^{n-k}$ classes, the mean number of error patterns with the weighting w in each class is:

$$n_w = \begin{cases} \dfrac{N_2 - 2^{n-k} + (n+1)}{2^{n-k}} & \text{for } w = 2 \\ \dfrac{N_w}{2^{n-k}} & \text{for } w > 2 \end{cases} \qquad (3)$$

The different probabilities of occurrence of unidentified errors can now be calculated as now described.

In case 1 (that is to say for the class 0), the probability that a received data block which is considered to be correct has unidentified message bit errors is:

$$P_u = \sum_{w \geq 2} n_w P_w \qquad (4)$$

In case 2 (that is to say for the classes 1 to k), the probability of one, and only one, single message bit being incorrect for one class is $$P_a = P_1 \qquad (5)$$

The probability in this case of having more than one message bit error is then:

$$P_b = \sum_{w \geq 2} n_w P_w = P_u \qquad (6)$$

If error correction is always carried out when a message bit error is found, the probability of incorrect error correction being carried out is:

$$P_{wc} = \frac{P_b}{P_a + P_b} \qquad (7)$$

An unidentified error in a message bit occurs when either an incorrect message bit is not identified or when incorrect error correction is carried out. The overall probability of occurrence of an unidentified message bit error is thus:

$$P'_u = P_u + P_{wc} \qquad (8)$$

For CS-4, the following values are obtained for $p=10^{-3}$ and $p=10^{-2}$:

$$p=10^{-3}: P_u \approx 4\cdot 10^{-7}, P'_u \approx P_{wc} = 6.47\cdot 10^{-4} \qquad (9)$$

$$p=10^{-2}: P_u \approx 10^{-5}, P'_u \approx P_{wc} = 0.088 \qquad (10)$$

In other words, one in 1546 error corrections is incorrect when $p=10^{-3}$, and one in 11 error corrections is incorrect when $p=10^{-2}$ (as already mentioned, this result relates to the situation in which a correction is always carried out when a single bit error is identified). In consequence, $P'_u$ is three to four orders of magnitude greater than $P_u$. The influence of incorrect corrections on the occurrence of unidentified errors is thus significantly greater than the influence of errors which exist from the start and are not identified as such. The increase in the probability of occurrence of unidentified errors by about three orders of magnitude is the reason why a correction, which must be carried out according to the prior art, of single bit errors in CS-4 is unacceptable.

For the purposes of the invention, simulations have been carried out for CS-4 with values of $S_{HFW1}=S_{HFW2}=4$ and $K_{SB}=16$ using a method based on the third exemplary embodiment of the invention. In this case, no unidentified errors occurred in any of the simulations with up to $10^5$ blocks. Therefore, the probability of occurrence of unidentified errors with this method is several orders of magnitude less than when single bit error correction is essential, without soft-bit checking.

We claim:

1. A method for error correcting a data signal transmitted via a channel and containing data blocks with associated error checking information, which comprises the steps of:
    deciding message bits in a transmitted data block resulting in decided message bits;
    calculating soft-bit values relating to the decided message bits in the data block, the soft-bit values being representative of a level of reliability of a message bit decision;
    evaluating the associated error checking information with respect to the data block to determine if a single bit error exists and, if the single bit error exists, determining a location of the single bit error resulting in a located single error bit; and
    correcting the located single bit error, if:
        a first variable, determined on a basis of the soft-bit values and allows an assessment as to whether more than one decided message bit in the data block is incorrect, satisfies a first threshold value condition; and
        a second variable, determined on a basis of the soft-bit values and allows an assessment as to whether the decided message bit to be corrected is incorrect, satisfies a second threshold value condition.

2. The method according to claim 1, which further comprises performing the method for error correcting the data blocks in general packet radio service mobile radio systems.

3. The method according to claim 1, which further comprises performing the method for error correcting on data blocks which have been error-protection-coded in accordance with coding scheme CS-4.

4. The method according to claim 1, which further comprises performing the calculating and deciding steps with an equalizer.

5. A device for error correcting a data signal transmitted via a channel and containing data blocks with associated error checking information, the device comprising:
    bit decision means for deciding message bits in a transmitted data block resulting in decided message bits;
    means for calculating soft-bit values relating to the decided message bits in the data block, the soft-bit values being representative of a level of reliability of a message bit decision;
    means for evaluating the associated error checking information with respect to the data block to determine whether a single bit error exits and, if the single bit error exists, determining a location of the single bit error resulting in a located single bit error; and means for error correcting the located single bit error if:
        a first variable, determined on a basis of the soft-bit values and allows an assessment as to whether more than one decided message bit in the data block is incorrect, satisfies a first threshold value condition; and
        a second variable, determined on a basis of the soft-bit values and allows an assessment as to whether the decided message bit to be corrected is incorrect, satisfies a second threshold value condition.

6. The device according to claim 5, wherein the device is configured for error correcting data blocks in general packet radio service mobile radio systems.

7. The device according to claim 5, wherein the device is configured for error correcting the data blocks which have been error-protection-coded in accordance with coding scheme CS-4.

8. The device according to claim 5, wherein said bit decision means and said means for calculating soft-bit values are performed by a hard and soft output equalizer.

9. A device for error correction of a data signal transmitted via a channel and containing data blocks with associated error checking information, the device comprising:
    a hard and soft output equalizer for deciding message bits in a transmitted data block and for calculating soft-bit information relating to decided message bits in the data block, the soft-bit information being representative of a level of reliability of a message bit decision;
    an error checking unit for evaluating the associated error checking information with respect to the data block to determine whether a single bit error exits and, if the single bit error exists, determining a location of the single bit error resulting in a located single bit error; and
    an error correction unit for correcting the located single bit error if:
        a first variable, determined on a basis of the soft-bit information and allows an assessment as to whether more than one decided message bit in the data block is incorrect, satisfies a first threshold value condition; and
        a second variable, determined on a basis of the soft-bit information and allows an assessment as to whether the decided message bit to be corrected is incorrect, satisfies a second threshold value condition.

* * * * *